United States Patent
Kazmi et al.

(10) Patent No.: US 9,866,284 B2
(45) Date of Patent: Jan. 9, 2018

(54) METHOD, RADIO NETWORK CONTROLLER, RADIO BASE STATION AND USER EQUIPMENT FOR SELECTING DOWNLINK MODE

(75) Inventors: Muhammad A. Kazmi, Bromma (SE); Jinhua Liu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 314 days.

(21) Appl. No.: 13/510,384

(22) PCT Filed: Apr. 26, 2012

(86) PCT No.: PCT/SE2012/050438
§ 371 (c)(1),
(2), (4) Date: May 17, 2012

(87) PCT Pub. No.: WO2012/158092
PCT Pub. Date: Nov. 22, 2012

(65) Prior Publication Data
US 2012/0287876 A1 Nov. 15, 2012

Related U.S. Application Data

(60) Provisional application No. 61/485,974, filed on May 13, 2011.

(51) Int. Cl.
*H04B 7/02* (2006.01)
*H04W 88/06* (2009.01)
*H04B 7/022* (2017.01)

(52) U.S. Cl.
CPC ............. *H04B 7/022* (2013.01); *H04W 88/06* (2013.01)

(58) Field of Classification Search
CPC . H04W 72/0406; H04W 72/02; H04W 88/06; H04W 16/10; H04B 7/022; H04B 7/0639; H04L 1/0026
(Continued)

(56) References Cited

U.S. PATENT DOCUMENTS 6,985,741 B2 *   1/2006  Palenius ................. 455/453
2008/0298482 A1 * 12/2008  Rensburg et al. ............ 375/260
(Continued)

FOREIGN PATENT DOCUMENTS

| CN | 101626601 A | 1/2010 |
| RU | 2009132536 A | 3/2011 |
| WO | 2008092908 A2 | 8/2008 |

OTHER PUBLICATIONS

Zhang Hui et al., Subcarrier Reource Optimization for Cooperated Multipoint Transmission, Oct. 18, 2010, International Journal of Distributed Sensor Networks, Hundawi Publishing Corporation, vol. 2010, Article ID 509297.*
(Continued)

*Primary Examiner* — Jeffrey M Rutkowski
*Assistant Examiner* — Fangyan Deng
(74) *Attorney, Agent, or Firm* — Coats & Bennett, PLLC

(57) ABSTRACT

It is presented a method for selecting downlink mode for a UE. The method is executed in a radio network controller, RNC, and comprises the steps of: estimating geometry for the UE; selecting a mode for the UE based on the estimated geometry, the mode being either a multi cell switching mode or a multi cell aggregation mode; and configuring the selected mode for the UE. By using the geometry of the UE for selecting mode, the most appropriate mode in terms of performance, such as capacity. Corresponding methods for an RBS, a UE, along with corresponding RNC, RBS and UE are also presented.

25 Claims, 4 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2010/0056170 A1* | 3/2010 | Lindoff et al. ............. | 455/452.1 |
| 2010/0248728 A1* | 9/2010 | Sun ....................... | H04W 16/10 |
| | | | 455/450 |
| 2010/0278130 A1 | 11/2010 | Sambhwani et al. | |
| 2010/0290381 A1* | 11/2010 | Gu et al. ...................... | 370/311 |
| 2011/0034206 A1* | 2/2011 | Venkatraman et al. ...... | 455/522 |
| 2011/0261704 A1* | 10/2011 | Etemad ......................... | 370/252 |
| 2012/0163338 A1* | 6/2012 | Zhang et al. ................. | 370/331 |
| 2012/0257568 A1* | 10/2012 | Cai et al. ..................... | 370/328 |
| 2013/0039234 A1* | 2/2013 | Li et al. ........................ | 370/280 |

OTHER PUBLICATIONS

Ericsson, et al., "Multi-point transmission techniques for HSPA", 3GPP TSG RAN WG1 Meeting #62bis, pp. 1-16, Nov. 15-19, 2010, Jacksonville, USA, R1-106251.

Huawei, et al., "HSDPA multipoint transmission consideration", 3GPP TSG-RAN WG2 #74, pp. 1-7, May 9-13, 2011, Barcelona, Spain, R2-112935.

Nokia Siemens Networks, et al., "Multi-cell transmission techniques for HSDPA", 3GPP TSG-RAN WG1 Meeting #62, pp. 1-10, Aug. 23-27, 2010, Madrid, Spain, R1-104913.

Nokia Siemens Networks, et al., "Signaling and configuration for the multi-point transmissions schemes", 3GPP TSG-RAN WG2 Meeting #74, pp. 1-3, May 9-13, 2011, Barcelona, Spain, R2-113167.

Qualcomm Incorporated, "Further details and benefits of deploying DC-HSDPA UEs in Single Frequency Networks", 3GPP TSG RAN WG1 Meeting #62, pp. 1-12, Aug. 23-27, 2010, Madrid, Spain, R1-104738.

ZTE, "Some aspects of DC-HSDPA operation in single frequency network", 3GPP TSG RAN WG1 Meeting #63, pp. 1-3, Nov. 15-19, 2010, Jacksonville, USA, R1-106252.

Qualcomm Incorporated, "On deploying DC-HSDPA UEs in Single Frequency Networks," 3GPP TSG RAN WG1 Meeting #61-bis, R1-103859, Dresden, Germany, Jun. 29-Jul. 2, 2010.

Nokia Siemens Networks, "Proposed study item on HSDPA multipoint transmission," 3GPP TSG RAN Meeting #50, RP-101439, Istanbul, Turkey, Dec. 7-10, 2010.

Nokia Siemens Networks, "3rd Generation Partnership Project; Technical Specification Group Radio Access Network; HSDPA Multipoint Transmission (Release 11)," 3GPP TR 25.8XX V0.1.3 (Mar. 2011).

* cited by examiner

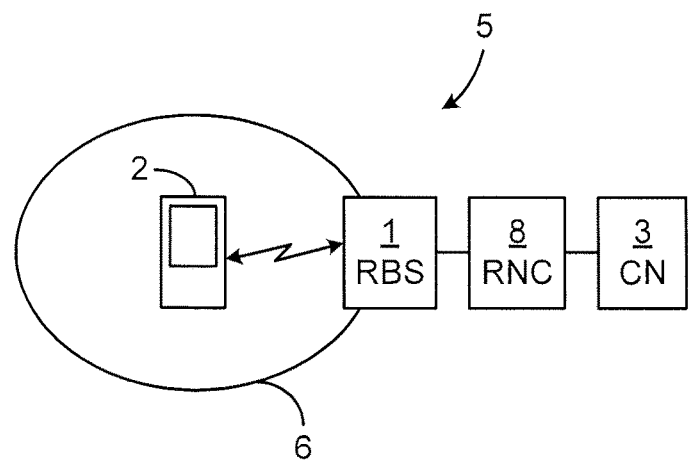
Fig. 4
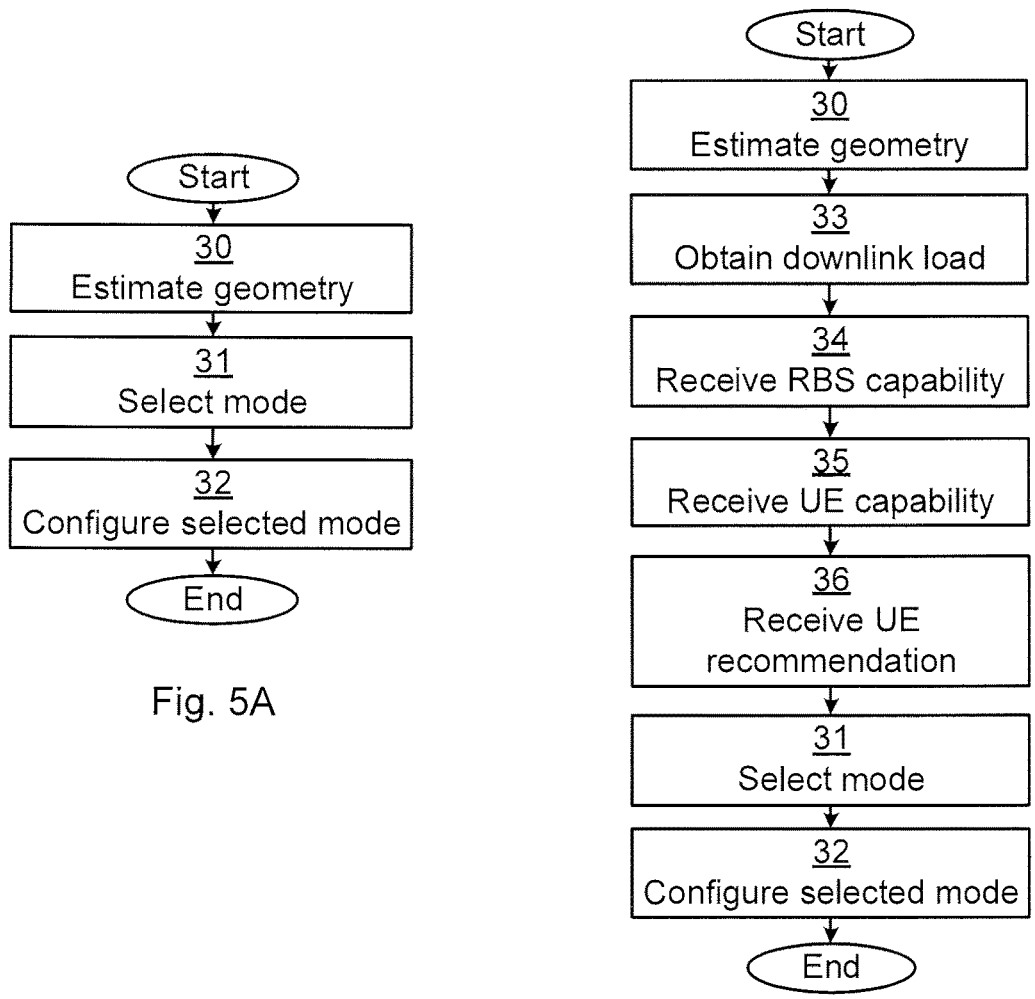
Fig. 5A
Fig. 5B

METHOD, RADIO NETWORK CONTROLLER, RADIO BASE STATION AND USER EQUIPMENT FOR SELECTING DOWNLINK MODE

TECHNICAL FIELD

The present invention relates generally to wireless communications and in particular to configuring User Equipment (UE) between various modes for the reception of multi-point transmissions.

BACKGROUND

Several trends are apparent in modern wireless communication systems. Firstly, User Equipment (UE) capabilities and processing power have increased considerably. This is driven, in part, by the development of the long-term evolution (LTE) advances to wireless communication protocols, such as Global system for mobile communications (GSM) and Universal Mobile Telecommunications System (UMTS), in order to support high peak data rates. The trend is also driven by the multi-carrier (MC) evolution within Wideband CDMA (Code Division Multiple Access)/High Speed Packet Access (WCDMA/HSPA).

Secondly, main-remote network architectures, in which multiple cells located at different physical locations share a baseband unit (and which enables coordination between the cells), are becoming increasingly popular.

Thirdly, the user demand for high peak data rates, and operators' desire to manage their wireless resources efficiently, have both increased and continue to do so. This is a consequence of mobile operators having begun to rely on WCDMA/HSPA technology to offer mobile broadband services.

Observation of these trends has triggered discussions in the Third Generation Partnership Project (3GPP) on standardizing support for multi-cell transmissions. Several multi-cell transmissions techniques have been discussed in 2010, including switched transmit diversity techniques, multi-flow transmission techniques, and single-frequency network transmissions.

Data-discontinuous transmission techniques include HS-DDTx (High Speed Data Downlink Transmitter), as described in R1-104913, "Multi-cell transmission techniques for HSDPA (High-Speed Downlink Packet Access), Nokia Siemens Networks, Nokia, and SF-DC-HSDPA (Single Frequency Dual Cell HSDPA) switching, as described in R1-104738, "Further details and benefits of deploying DC-HSDPA (Dual Cell HSDPA) UEs in Single Frequency Networks", Qualcomm Europe. This class of techniques is based on HSDPA transmissions from different cells being coordinated so that the inter-cell interference is reduced.

Multi-flow transmission techniques include SF-DC-HSDPA aggregation. This class of techniques is based on several, independent data streams being transmitted to the same UE from different cells located at the same or different sites.

Single-frequency network transmissions include HS-SFN (High Speed Single Frequency Network). This technique is based on identical data to the same UE being transmitted from multiple cells simultaneously. The transmitted data is combined in the "air," and the UE consequently benefits from a stronger received signal.

Downlink multi-point transmission techniques are mainly useful when the signal strengths for multiple cells are comparable and the non-serving cells are partially loaded. There are two modes in the SF-DC-HSDPA: SF-DC Aggregation and SF-DC Switching.

In SF-DC Aggregation, either of dual cells can simultaneously transmit different transport blocks to the same UE; the two cells can belong to the same NodeB (Intra-NodeB aggregation) or different NodeBs (Inter-NodeB aggregation); and The SF-DC UE with advanced receiver can gain from this approach by suppressing interference between flows.

In SF-DC Switching, only one of dual cells can transmit a data block to the UE at a given TTI (Transmission Time Interval); the better cell (e.g. a cell with higher CQI (Channel Quality Indicator)) is selected to transmit data; the H-ARQ (Hybrid Automatic Repeat Request) retransmission to a UE can be scheduled in either cell; and the UE with a less advanced receiver can also gain from this approach.

For both of these cases, the HS (High Speed) timing between the two cells may be asynchronous; the UE monitors HS-SCCH (High Speed Shared Control Channel) from both cells; and the ACK/NACK (Acknowledgement/Negative Acknowledgement) and CQI information for either cell are reported jointly.

To determine the downlink multi-point transmission, the network can reuse existing events (e.g., Event 1a/b) and measurements (e.g. scheduling information (SI) or CQI). Alternatively new measurements and events could be defined. At RAN (Radio Access Network) #50 a study item on downlink multi-point transmission techniques was approved. See RP-101439, "Proposed study item on HSDPA multipoint transmission".

The communication performance can be different for these different modes in different situations. How to determine the optimal mode for a given UE, and how to configure the UE for the selected mode, is thus a challenge.

SUMMARY

According to a first aspect it is presented a method for selecting downlink mode for a UE. The method is executed in a radio network controller, RNC, and comprises the steps of: estimating geometry for the UE; selecting a mode for the UE based on the estimated geometry, the mode being either a multi cell switching mode or a multi cell aggregation mode; and configuring the selected mode for the UE. By using the geometry of the UE for selecting mode, the most appropriate mode in terms of performance, such as capacity.

The step of estimating geometry may comprise using Common Pilot Indicator Channel Chip Energy/Noise, CPICH $E_c/N_o$, or Received Signal Code Power, RSCP.

The step of selecting a mode may comprise selecting the multi cell switching mode when the geometry is high and selecting the multi cell aggregation mode when the geometry is low.

In the step of selecting, the multi cell switching mode may be a dual cell switching mode and the multi cell aggregation mode may be a dual cell aggregation mode. The multi cell mode requires at least two cells. Therefore dual cell mode is the simplest form of multi cell modes.

The step of selecting a mode of the UE may comprise selecting a mode for the UE based on the estimated geometry, the mode being either a dual cell switching mode, a dual cell aggregation mode or a default mode. The default mode means that a secondary High-Speed Downlink Shared Channel, HS-DSCH, serving cell is deactivated for the UE. In other words, the default mode is a single cell mode.

The step of estimating a geometry may comprise estimating the geometry according to:

$$HsGeometry = (maximumDlTxPower - nonHsPower) / CpichPower * CpichE_c/N_o$$

where HsGeometry is the geometry, CpichPower is the CPICH power, $CpichE_c/N_o$ is the reported CPICH $E_c/N_o$ by the UE, maximumDlTxPower is the maximum downlink transmit power and nonHsPower is the non-HS, High Speed, power reported by a Node B.

The step of estimating a geometry may comprise estimating a downlink geometry for a primary and secondary High-Speed Downlink Shared Channel, HS-DSCH, serving cells, and the step of selecting a mode may comprises evaluating a function depending on the downlink geometry for the primary and secondary HS-DSCH serving cells, such that when the result of the evaluation is higher than a first predefined threshold, the multi cell switching mode is selected, otherwise the multi cell aggregation mode is selected.

The method may further comprise the step of: obtaining downlink load, and the step of selecting a mode may include considering the downlink load. The load is another parameter which can be considered to more accurately select the most appropriate mode.

The method may further comprise the step of: receiving RBS (Radio Base Station) capability and UE capability in terms of supported modes; and the step of selecting a mode for the UE may take into account the received capabilities for the RBS and UE. In this way modes that are not supported by the RBS and/or UE can be avoided.

The capabilities in terms of supported mode may be frequency band dependent.

The method may further comprise the step of: receiving, from the UE, a recommendation of selected mode; and the step of selecting a mode for the UE may consider the recommendation of selected mode. In other words, the UE can suggest, based on measurements, a mode available for the UE. This suggestion can be followed or overruled by the RNC. The RNC may also use other UE measurement reports (e.g. CPICH measurements) and/or base station measurements to decide whether to select or overruled the mode recommended by the UE.

According to a second aspect, it is presented a method for selecting downlink mode for a UE. The method is executed in an RBS, and comprises the steps of: estimating downlink quality for the UE; selecting a mode for the UE based on the estimated downlink quality, the mode being either a switching mode or an aggregation mode; and configuring the selected mode for the UE. It has been found that the also the RBS can select an appropriate mode for the UE, based on downlink quality.

The step of estimating downlink quality may comprise estimating the downlink quality for both primary and secondary, High-Speed Downlink Shared Channel, HS-DSCH, serving cells.

The step of estimating the downlink quality may comprise estimating available HS-DSCH SINR, Signal to Interference and Noise Ratio.

The available HS-DSCH SINR may be estimated according to:

$$availSfdcHsSINR = SF_{Hs} * CINR_{CPICH} * (maximumDlTxPower - nonHsPower)/CpichPower$$

where availSfdcHsSINR is the available HS-DSCH SINR for the UE in a cell, $CINR_{CPICH}$ is the Common Pilot Indicator Channel Carrier to Interference and Noise Ratio estimated from reported CQI, Channel Quality Indicator, $SF_{Hs}$ is the spreading factor of High Speed Physical Downlink Shared Channel, HS-PDSCH.

In the step of selecting, the multi cell switching mode may be a dual cell switching mode and the multi cell aggregation mode may be a dual cell aggregation mode.

The step of selecting a mode of the UE may comprise selecting a mode for the UE based on the estimated geometry, the mode being either a dual cell switching mode, a dual cell aggregation mode or a default mode. The default mode means that a secondary High-Speed Downlink Shared Channel, HS-DSCH, serving cell is deactivated for the UE.

The method may further comprise the step of: obtaining configuration data from a controlling node in terms of modes that can be used; and the step of selecting a mode may comply with the configuration data.

The controlling node may be an RNC.

The method may further comprising the step of: receiving, from the UE, a recommendation of selected mode; and wherein the step of selecting a mode for the UE considers the recommendation of selected mode.

A third aspect is a method executed in a UE, for suggesting a downlink mode. The method comprises the steps of: estimating performance for a default mode, multi cell switching mode and multi cell aggregation mode; selecting a mode being one of the default mode, multi cell switching mode and multi cell aggregation mode which has the highest estimated performance, wherein the default mode means that a secondary High-Speed Downlink Shared Channel, HS-DSCH, serving cell is deactivated for the UE; and reporting the selected mode as a recommendation to the network. In other words, it is the UE that evaluates the various modes and makes a performance maximising suggestion based on the parameters and/or measurements available to the UE.

The estimated performance may comprise one or more of the parameters of bitrate, throughput and signal quality.

A fourth aspect is a radio network controller, RNC, for selecting downlink mode for a UE. The RNC comprises a processor configured to: estimate geometry for the UE; select a mode for the UE based on the estimated geometry, the mode being either a multi cell switching mode or a multi cell aggregation mode; and configure the selected mode for the UE.

A fifth aspect is a radio base station, RBS, for selecting downlink mode for a UE. The RBS comprising a processor configured to: estimating downlink quality for the UE; select a mode for the UE based on the estimated downlink quality, the mode being either a switching mode or an aggregation mode; and configure the selected mode for the UE.

A sixth aspect is a UE, for suggesting a downlink mode. The UE comprises a processor configured to: estimate performance for a single cell mode, multi cell switching mode and multi cell aggregation mode; select a mode being one of the default mode, multi cell switching mode and multi cell aggregation mode which has the highest estimated performance, wherein the default mode means that a secondary High-Speed Downlink Shared Channel, HS-DSCH, serving cell is deactivated for the UE; and report the selected mode as a recommendation to the network.

A sixth aspect is a method for selecting transmission mode for a user equipment, UE. The method is executed in a network node of a mobile communication network and comprises the steps of: estimating quality for transmission to the UE; selecting a mode for the UE, the mode being either a multi cell switching mode, a multi cell aggregation mode or a single cell legacy mode; and configuring the selected mode for the UE. The network node can be an RBS or an RNC and the quality can e.g. be geometry or downlink quality. The sixth aspect is thus essentially a combination of the first and second aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 4 is a schematic diagram showing an environment in which embodiments presented herein can be applied;

FIGS. 5A-5B are flow charts illustrating methods performed in the RNC (Radio Network Controller) of FIG. 4, according to some embodiments;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Analysis of SF-DC Performance

Figure 1:
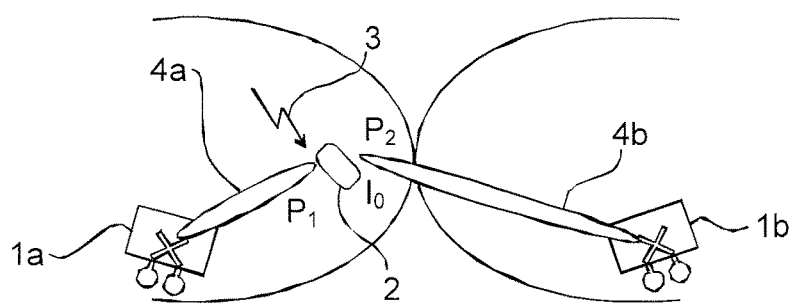
FIG. 1 is a schematic functional block diagram of SF-DC-HSDPA Aggregation.

The system model of aggregation mode can be seen in FIG. 1. Here P1 and P2 describe the received power associated with the two cells. In other words, a first power P1 is received at the UE2 from a primary RBS (Radio Base Station) 1a over a first radio interface 4a, while a second power P2 is received 2 at the UE from a secondary RBS 1b over a second radio interface 4b. Io is the interference 3 from other cells and the white noise. This interference 3 also relates to how it is received at the UE2. It is to be noted that the terms Node B and RBS are used interchangeably herein, as the examples presented relate to a WCDMA system. It is to be noted though, that the ideas presented herein are not limited to WCDMA and can, where applicable, be used in other types of systems, such as LTE.

Figure 2:
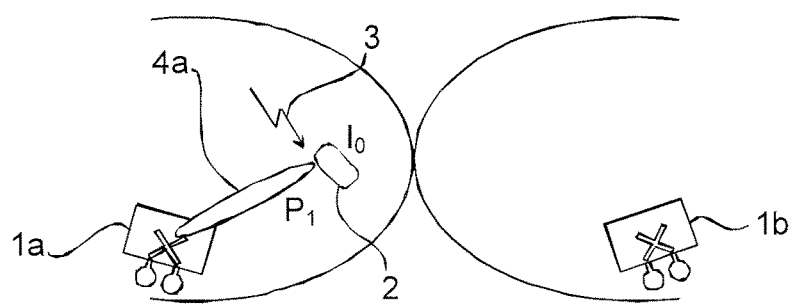
FIG. 2 is a schematic functional block diagram of SF-DC-HSDPA Switching.

The system model of switching mode can be seen in FIG. 2. Here, the only useful power is the power P1 which the UE2 receives over the first radio interface 4a from the primary radio base station 1a. All other power received at the UE2 forms part of the interference 3.

Now, if the UE2 only is served by its serving cell, the Signal to Interference and Noise Ratio (SINR) can be written as $$SINR = \frac{(P_1)}{\alpha \cdot (P_1) + I_0} \quad (1)$$

where α represents the non-orthogonal factor which results in the self-interference.

The capacity C of the link is modelled by means of the Shannon bound, i.e.:

$$C = \log_2(1 + SINR_1) \quad (2)$$

If both cells transmit the different data and the SINR of each data stream can be written as:

$$SINR_1 = \frac{P_1}{\alpha \cdot P_1 + \beta \cdot P_2 + I_0} \quad (3)$$

$$SINR_2 = \frac{P_2}{\alpha \cdot P_2 + \beta \cdot P_1 + I_0} \quad (4)$$

where β represents the interference cancellation factor of the second, other, cell and $P_1$ is the power received from the primary serving base station and $P_2$ is the power received from the secondary serving base station.

The capacity C of the link is modelled by means of the Shannon bound, i.e.:

$$C = \log_2(1 + SINR_1) + \log_2(1 + SINR_2) \quad (5)$$

Figure 3:
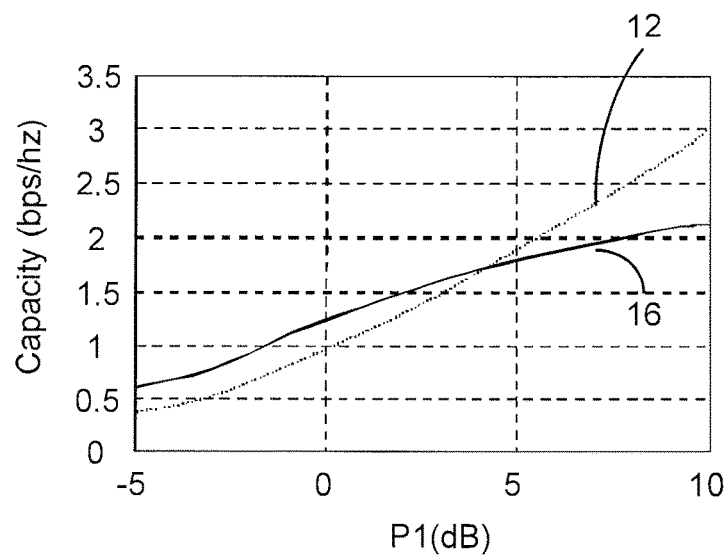
FIG. 3 is a graph depicting a comparison of capacity between SF-DC-HSDPA Aggregation and Switching.

FIG. 3 depicts a capacity comparison between the SF-DC-HSDPA aggregation and switching modes. Here, a dotted line 12 represents capacity for the switching mode, and a solid line 16 represents capacity for the aggregation mode, as a function of the power P1 which the UE 2 receives over the first radio interface 4a from the primary radio base station 1a.

From equations (1)-(5) and the FIG. 3, it is easy found that the two modes (SF-DC aggregation and SF-DC switching) have different performance in different situations.

In case of high geometry, the switching mode has better performance than aggregation mode. Conversely, in case of low geometry, the aggregation mode can have better performance. Geometry can be defined as the ratio of the power received on the radio link in question to the sum of the noise and the powers received on the other radio links.

The inter-cell interference suppression/cancellation efficiency of the UE receiver is important for mode selection. High inter-cell interference suppression/cancellation efficiency can help aggregation mode considerably. In contrary conditions, the switching mode is preferred.

Additionally, aggregation mode generates more inter-cell interference for the users in adjacent cells, especially in medium load case. In the case of a SF-DC UE with low bit-rate, aggregation is not needed. Further, when a UE is in a soft handover area comprising mixed RBS (i.e., both legacy RBS and SF-DC-HSDPA capable RBS), the aggregation is not optimal. Legacy RBS is here to be interpreted as an RBS which is not capable of SF-DC-HSDPA. The legacy RBS is only capable of single cell operation, which is also referred to as a default mode. The default mode is thus a single cell operation mode.

Because the gain from different SF-DC modes depends on varying factors, as well as the UE characteristics, both the UE and the system performance may deteriorate if these factors are not considered. Examples of these factors include:

the geometry of the SF-DC capable UE
the traffic load in adjacent cells
the receiver performance of the SF-DC capable UE
the required bit-rate of the SF-DC capable UE
the capability of UE (switching, aggregation, 2C (two cells), 4C (four cells). etc.)
mixture of SF-DC capable and legacy Node Bs Several methods are disclosed herein to conditionally configure the mode of a SF-DC capable UE in order to improve the performance of the SF-DC capable UE and the system performance. These include to network-based solutions; solutions using new UE measurements; and solutions incorporating UE recommendations.

The network-based solutions include RNC based and Node B-based embodiments. In the RNC based solution, the RNC configures the mode of SF-DC capable UE with RRC (Radio Resource Control) signaling based on the existing measurement reports, e.g. CPICH (Common Pilot Channel) $E_c/N_o$ (or RSCP (Received Signal Code Power)), DL (Downlink) transmit power, estimated downlink cell load, traffic type, and the like. In the Node B-based solution (appropriate for the intra-Node B SF-DC case), the serving Node B configures the mode of SF-DC capable UE based on the DL load of cells and UE CQI report, traffic type, and the like.

In either network-based solution, the UE can measure and report the experienced inter-cell interference level, based on which (along with other existing reports) the network configures the mode for SF-DC UE. Also, in either network-based solution, the SF-DC UE can recommend a mode according to the available information on the UE side. The network then determines the mode for the UE, which network may consider the recommendation by the UE, but is not obliged to follow the recommendation.

Embodiments of the present invention this include one or more of 1) set of criteria used for selecting the mode in the network node (e.g. RNC or RBS) or in the UE; 2) signaling for configuring the network node (e.g. RBS) and UE with the mode(s); and 3) New measurements in UE for mode selection.

These concepts may be extended to multi-carrier multi-cell HSDPA, e.g. DF-D(4)C-HSDPA (Dual Frequency Dual (4) Cell HSDPA), and/or more advanced UEs (i.e. UEs that can support more data streams and/or carrier frequencies), and other multiple point transmission technologies. However, for the purpose of explanation, embodiments are described herein based on the SF-DC capable UE. However the invention also applies for the scenarios comprising multiple carrier multi-cell HSDPA multipoint transmission.

Two network-based solutions are now described below, the RNC based solution and the RBS based solution.

RNC Based Solution

According to this embodiment, the RNC may select and configure the mode for a SF-DC UE based on the estimated UE geometry by using CPICH Ec/Io (or RSCP). The geometry can be estimated as:

$$\text{HsGeometry} = (\text{maximumDlTxPower} - \text{nonHsPower}) / \text{CpichPower} * \text{CpichE}_c/N_o \quad (6)$$

where HsGeometry is the geometry,
CpichPower is the CPICH power,
$\text{CpichE}_c/N_o$ is the reported CPICH $E_c/N_o$ by the UE,
maximumDlTxPower is the maximum downlink transmit power and
nonHsPower is the non-HS power reported by the Node B.

The coefficient based the downlink geometry of SF-DC UE can be expressed as $f(\text{HsGeometry}_1, \text{HsGeometry}_2)$, where $\text{HsGeometry}_1/\text{HsGeometry}_2$ is the downlink geometry of the primary/secondary HS-DSCH (High Speed Downlink Shared Channel) serving cell.

If $f(\text{HsGeometry}_1, \text{HsGeometry}_2)$ is higher than a first predefined threshold, the switching mode is selected for the SF-DC UE, otherwise the aggregation mode is selected for the SF-DC UE. If $\text{HsGeometry}_2$ is lower than a second predetermined threshold, the default mode is selected for the SF-DC UE, which means that the secondary HS-DSCH serving cell is deactivated for the SF-DC UE. The first and second thresholds can be different for different UE receiver types.

This approach is straightforward, but it does not consider the downlink traffic load, downlink resources situation of the secondary HS-DSCH serving cell, the characteristics of the UE receiver, or other factors.

There exist advanced methods that consider multiple factors such as the UE geometry, the UE receiver capability, the required bitrate for the SF-DC UE, and the downlink traffic load of both the primary and secondary HS-DSCH serving cell. For example, two methods are described to select the mode for the SF-DC UE according to the ways to estimate the downlink HS-DSCH load.

Firstly, the downlink load is one factor which is beneficial to consider for the mode switch for SF-DC UE.

One example is that the RNC can estimate the DL HS load based on the reported DL carrier power [see 3GPP Spec 25.215] to estimate the available HS-DSCH power for a cell as.

$$\text{availHsPower} = f(\text{maximumDlTxPower} - \text{nonHsPower}) \quad (7)$$

where maximumDlTxPower is the maximum DL transmit power;
availHsPower is the available HS-DSCH power;
measDlTxPower is the DL transmit power reported by the Node B; and
f(*) means a certain filtering. Examples of filtering are mean, $X^{th}$ percentile, median, low pass filtering etc. The RNC may also use additional parameters such as the measDlTxPower when estimating the available HS power (availHsPower).

Then maximum achievable HS-DSCH $E_c/N_o$ can be expressed as $$\text{maxSfdcEcNo} = \text{availHsPower}/\text{CpichPower} * \text{CpichE}_c/N_o \quad (8)$$

where maxSfdcEcNo is the maximum achievable HS-DSCH $E_c/N_o$ for the SF-DC UE.

A certain coefficient can be defined as $f(\text{maxSfdcEcNo}_1, \text{maxSfdcEcNo}_2)$, where $\text{maxSfdcEcNo}_1/\text{maxSfdcEcNo}_2$ is the maximum achievable HS-DSCH $E_c/N_o$ for the SF-DC UE in the primary/secondary HS-DSCH serving cell respectively. $f(\text{maxSfdcEcNo}_1, \text{maxSfdcEcNo}_2)$ has a higher value with higher $\text{maxSfdcEcNo}_1$ and $\text{maxSfdcEcNo}_2$.

Another way to estimate the cell load is based on the load or traffic on the backhaul links e.g. Iub data flow statistics. For instance, the Node B asks for the data from the RNC according to the radio interface capability. The buffer at the RNC can be full or above a threshold if the supportable HS-DSCH bit-rate on the radio interface is higher than the downlink data rate from upper layers. The RNC can either estimate the DL cell load based on the RLC (Radio Link Control) buffer status. It can also estimate the DL load based on whether it can provide the requested downlink data rate by the Node B over the interface between RNC and Node. Also, the RNC can also roughly estimate the scheduling priorities according to the traffic type of the SF-DC UE. A certain coefficient can be defined as f(rncDlBufferLevel$_1$, rncDlBufferLevel$_2$), where rncDlBufferLevel$_1$/rncDlBufferLevel$_2$ is the downlink RLC buffer level in RNC for the primary/secondary HS-DSCH serving cell respectively. f(rncDlBufferLevel$_1$, rncDlBufferLevel$_2$) has a higher value with a lower DL TX buffer level in both the primary and secondary HS-DSCH serving cell.

Secondly, a certain coefficient dependent on the DL traffic of the UE can be defined as a function of the traffic, f(traffic). f(traffic) depends on the traffic of the SF-DC UE. For instance, f(traffic) has a higher value with a higher traffic priority and or lower required DL bit-rate for the SF-DC UE. An example of f(traffic) is:

$$f(\text{traffic}) = Tp^* \text{user bit rate/maximum possible user bit rate} \quad (9)$$

where Tp is the traffic priority level, which here can vary between 1 and 5 where 5 means highest priority level.

Thirdly, a certain coefficient dependent on the interference suppression/cancellation efficiency can be defined as f(receiverType). f(receiverType) has a lower value for the receiver with higher interference suppression/cancellation efficiency.

If the maximum available HS-DSCH $E_c/N_o$ is used as an input, the final coefficient to determine the mode of the SF-DC UE can be expressed as $$\text{sfdcModeCoef} = f(\text{maxSfdcEcNo}_1, \text{maxSfdcEcNo}_2)^* f(\text{traffic})^* f(\text{receiverType}) \quad (10)$$

Or, if the RNC downlink RLC buffer level is used as an input, the final coefficient to determine the mode of the SF-DC UE can be expressed as $$\text{sfdcModeCoef} = f(\text{rncDlBufferLevel}_1, \text{rncDlBufferLevel}_2)^* f(\text{traffic})^* f(\text{receiverType}) \quad (11)$$

Similarly, different thresholds can be defined to select DL TX mode for a SF-DC UE. If sfdcModeCoef is higher than a predefined threshold, the switching mode is selected for the SF-DC UE. Otherwise the aggregation mode is selected for the SF-DC UE. If maxSfdcEcNo$_2$ is lower than a second predetermined threshold and or the required downlink bit-rate of the SF-DC UE is lower than a third predetermined threshold, the default mode is selected for the SF-DC UE, which means that the secondary HS-DSCH serving cell is deactivated for the SF-DC UE.

Some signaling to configure the mode of the SF-DC UE should be specified, for instance the signaling to inform the serving Node B and the non-serving Node Bs, and the UE regarding the mode configuration for the SF-DC UE.

In case of inter-Node B SF-DC, the RNC based solution is preferable since RNC knows the situation of the non-serving Node Bs. The RNC may also take into account the RBS capability and also the UE capability in terms of supported modes when selecting the final mode. The RBS and UE signal these capabilities to the serving node e.g. RNC. The RNB and UE capabilities in terms of supported modes may also be frequency band dependent. For example the RBS and/or UE may support SF-DC-HSDPA switching and/or carrier aggregation for band 1 (2 GHz) and band 8 (900 MHz). Similarly the RNC may configure the RBS and UE for certain mode in band dependent fashion. For example the RNC may configure the UE and RBS to use certain mode (e.g. switching) on band 1 although they may support multiple bands e.g. band 1, band 7 and band 3.

Note that although multiple coefficients are included in equations (9) and (10), this does not mean that all these coefficients must be included. The final coefficient sfdcModeCoef to determine the mode of the SF-DC LIE can also be estimated based on one or some of factors.

RBS Based Solution

In principle, the RNC can deal with the SF-DC mode configuration in all cases. However, there can be a resulting delay. In case of intra-Node B SF-DC, the Node B can be more efficient to estimate the downlink quality/load in both the primary and secondary HS-DSCH serving cells. Hence, the serving Node B can be more efficient to configure the SF-DC mode for a SF-DC UE. Some examples to estimate the downlink quality are described below.

One example is that the Node B can estimate the available HS-DSCH SINR for the SF-DC UE.

$$\text{availSfdcHsSINR} = \text{SFHs}^* \text{CINRCPICH}^* (\text{maximumDlTxPower} - \text{nonHsPower})/\text{CpichPower}. \quad (12)$$

where availSfdcHsSINR is the available HS-DSCH SINR for the SF-DC UE in a cell, CINRCPICH is the CPICH CINR (Carrier to Interference-plus-Noise Ratio) estimated from reported CQI, SFHs (Slow Frequency Hopping Spreading Factor) is the spreading factor of HS-PDSCH (High Speed Physical Downlink Shared Channel).

Also, the Node B can estimate the scheduling probability of the SF-DC UE in both the primary and secondary HS-DSCH serving cells.

Similarly to the RNC based solution, there are both straightforward and more advanced approaches.

One straightforward solution for example can be based on the availSfdcHsSINR of both the serving and non-serving HS-DSCH serving cell. If f(availSfdcHsSINR$_1$, availSfdcHsSINR$_2$) is higher than a predetermined threshold, the switching mode is selected, otherwise the aggregation mode is selected. If the availSfdcHsSINR$_2$ is lower than another threshold, the default mode is selected which means the secondary HS-DSCH serving cell is deactivated. Here availSfdcHsSINR$_1$/availSfdcHsSINR$_2$ denote the maximum achievable HS-DSCH SINR in the primary/secondary HS-DSCH cell, respectively.

A more advance method, for example, is to include the traffic and the receiver type of the SF-DC UE.

$$\text{sfdcModeCoef} = f(\text{availSfdcHsSINR}_1, \text{availSfdcHsSINR}_2)^* f(\text{traffic})^* f(\text{receiverType}) \quad (13)$$

where f(traffic) and f(receiverType) are estimated in the same way as described above.

The SF-DC mode can be selected similarly as described above for the RNC based solution. If sfdcModeCoef is higher than a first predefined threshold, the switching mode is selected for the SF-DC UE. Otherwise the aggregation mode is selected for the SF-DC UE. If availSfdcHsSINR$_2$ is lower than a second predetermined threshold, the default mode is selected for the SF-DC UE, which means that the secondary HS-DSCH serving cell is deactivated for the SF-DC UE.

Even in the RBS based solution, the controlling node (e.g. RNC) can pre-configure the RBS whether the RBS can use certain type of mode e.g. switching mode, carrier aggregation mode or both.

Network Based Solution Using New UE Measurements

According to this embodiment, the UE can estimate the experienced inter-cell interference level (e.g. characterized as low, medium, or high) based on the received signal of the downlink pilots from the primary and the secondary HS-DSCH serving cell. There can be multiple ways in which the UE can report the experienced inter-cell interference level to the base station (e.g. Node B). Examples include time multiplexing with the TPC (Transmit Power Control) bits over DPCCH or with the CQI bits over HS-DPCCH; and merging this with the uplink scheduling information report or multiplexing with E-TFCI (E-DCH (Enhanced Dedicated Channel) Transport Format Combination Identifier) or with the happy bits or similar.

Then Node B can report this measurement to RNC for RNC based solution, or the LTE reports the measurement to RNC by RRC signaling.

For RNC based solution, a similar SF-DC mode selection policy as described above may be used based on the estimated sfdcModeCoef according to equations (9) and (10), after replacing f(receiverType) in the formula with a function of the experienced inter-cell interference level (ICIC), f(ICI).

For Node B-based solution, the Node B can estimate the received signal quality (e.g. SINR, SNR (Signal to Noise Ratio), BLER (Block Error Rate) etc.) degradation for SF-DC UE with the reported inter-cell interference from the UE itself. The aggregation mode is prohibited when the received SINR degradation for SF-DC UE is larger than a predetermined/preconfigured threshold.

The RNC can configure whether the Node B is allowed to change the SF-DC mode for a certain one or a group of SF-DC UEs. Also, the RNC can configure the thresholds used in the Node B by introducing a set of new RRC signaling or by reusing the existing signal in a certain way. The configuration can be done in the background or upon request from the Node B.

Network Based Solution with UE Recommendations

According to this embodiment, the UE can estimate the performance (e.g. achieved bit rate, throughput, signal quality, etc.) by default mode, switching mode and aggregation mode, and report the mode to the network.

Firstly, the UE selects the preferred SF-DC mode according to the configuration of the network to maximize the capacity e.g. higher bit rate. For instance, the UE can estimate the inter-cell interference suppression efficiency factor and keep the statistics of the frequencies to be scheduled and the received signal quality (e.g. SINR, BLER etc) each time the UE is scheduled using both the primary cell and secondary HS-DSCH serving cells. Based on these, the UE can estimate the achievable capacity for each mode and select the mode with the aim to maximize the total capacity (e.g. achievable throughput/bit rate) from both the primary and secondary HS-DSCH serving cells. The UE can also consider other factors such as latency difference from the primary cell and secondary HS-DSCH serving cells in SF-DC mode in a certain way. For instance, the default mode can be selected if the latency of the data received on the secondary serving cell is larger than a preconfigured value or a suitable threshold.

Based on the above information, the UE selects the mode and reports to the network by itself. The network may use the mode selected by UE.

The network can either follow the UE-recommended SF-DC or not. For example, the network may select a different SF-DC mode (i.e. different than the UE recommended SF-DC mode) especially in case that the network suspects that the UE-selected mode is not optimal e.g. due to an error or due to the bad implementation in the UE. The network may also use other UE measurement reports (e.g. CPICH measurements) and/or base station measurements to deduce whether the UE recommended mode is suitable or not.

Embodiments may thus be related to one or more of the following:

(1) the criteria based on which the network node (e.g. Node B/RNC) decides whether to schedule according to aggregation or switching mode;

(2) the signaling between network nodes. For example the exchange of signaling between the RNC and Node B for pre-configuration of the suitable modes needs to be protected. More specifically the RNC configures Node B whether the Node B is allowed to use i) aggregation mode ii) switching mode iii) or both. The benefit of the scheme depends upon the deployed scenarios, the load, etc. In this way the RNC has control over Node B operation. This involves signaling over Iub interface.

Additionally, the signaling between the network node and UE is one aspect. The RNC may also configure the UE which node B can be used for switch and which can be used for aggregation or both. Similarly the RNC can configure the UE which kind of measurements should be reported for network based mode selection.

(3) This information (new UE measurement/estimation) from the UE can be beneficial for example in the following manner:

UE receiver ability to suppress/cancel interference, the inter-cell interference suppression efficiency factor etc;

Some UEs can have good SIC (Successive Interference Cancellation) if the two data stream from the cells are transmitted at the same TTI. In this case, the aggregation in the same TTI is better;

Some UEs only have general interference suppress. In this case, the aggregation in the same TTI or different TTI is almost same;

The preferred UE selected mode.

FIG. 4 is a schematic diagram showing an environment in which embodiments presented herein can be applied. The mobile communications network 5 comprises a core network 3 and one or more RBSs 1, here in the form of Node Bs 1. The RBSs 1 could also be in the form of evolved Node Bs, BTSs (Base Transceiver Stations) and/or BSSs (Base Station Subsystems). The RBSs 1 provide radio connectivity to a plurality of UEs 2 (only one shown). The term UE is also known as mobile communication terminal, mobile terminal, user terminal, user agent, etc.

The mobile communication network 5 can e.g. comply with W-CDMA, LTE or any other network type where the principles presented herein can be applied.

The communication between each one of the UEs 2 and the RBSs 1 occurs over a wireless radio interface.

Each RBS 1 provides coverage using a corresponding cell 6. The RBSs 1 are controlled by the RNC 8. The RBSs 1 are also connected, via the RNC 8 to a core network 3 for connectivity to central functions and other networks.

FIGS. 5A-5B are flow charts illustrating methods performed in the RNC of FIG. 4, according to some embodiments. Firstly, the method illustrated in FIG. 5A will be described.

In an estimate geometry step 30, the geometry for the UE 2 is estimated as disclosed above. This can optionally involve the use of CPICH $E_c/N_o$ or RSCP.

In a select mode step 31, a mode is selected for the UE 2 based on the estimated geometry as disclosed above. The mode is either a multi cell switching mode, a multi cell aggregation mode or a default mode. The selection can work by selecting the multi cell switching mode when the geometry is high and selecting the multi cell aggregation mode when the geometry is low. In one embodiment, the multi cell switching mode is a dual cell switching mode and the multi cell aggregation mode is a dual cell aggregation mode.

In a configure selected mode step 32, the selected mode for the UE 2 is configured.

The method may be repeated at arbitrary frequency, even at speeds to allow mode selection in every TTI.

FIG. 5B is a flow chart illustrating a method performed in the RNC according to other embodiments. The steps of FIG. 5B having the same reference numerals as those of FIG. 5A are equivalent and will not be described again.

In an optional obtain downlink load step 33, the downlink load is obtained, e.g. as explained above.

In an optional receive RBS capability step 34, the capabilities of the RBS serving the UE in question is received as explained above. The capabilities are defined in terms of supported modes. These modes may be frequency dependent.

In an optional receive UE capability step 35, the capabilities of the UE in question is received as explained above. The capabilities are defined in terms of supported modes. These modes may be frequency dependent.

In an optional receive UE recommendation step 36, the RNC receives a recommendation from the UE. This recommendation contains the mode which the UE recommends to use.

The select mode step 31 takes into consideration the downlink load, RBS capability, UE capability and/or UE recommendation when one or more of these parameters are made available.

Figure 6A:
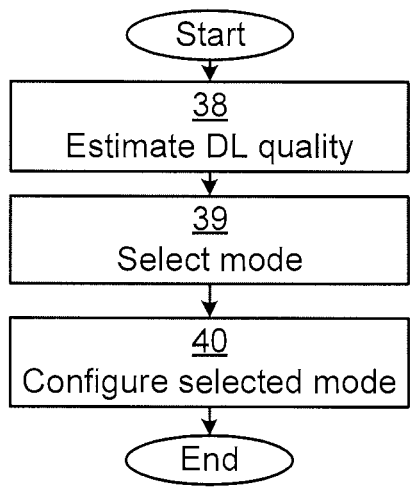
FIGS. 6A-6B are flow charts illustrating methods performed in the RBS (Radio Base Station) of FIGS. 1, 2 and 4, according to some embodiments.
Figure 6B:
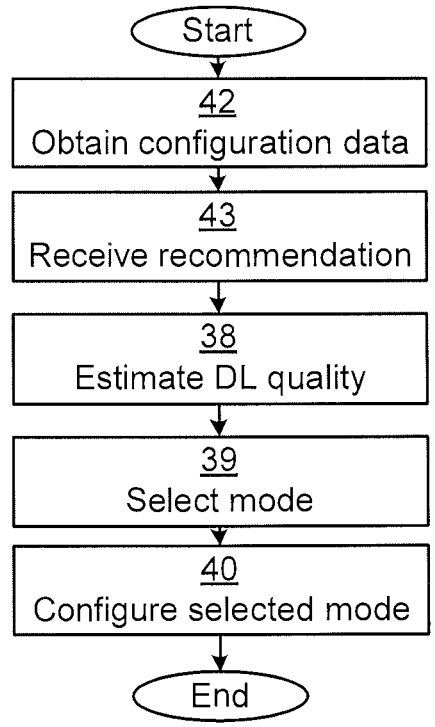

FIGS. 6A-6B are flow charts illustrating methods performed in the RBS of FIG. 4, according to some embodiments. Firstly, the method illustrated in FIG. 6A will be described.

In an estimate DL quality step 38, the downlink quality for the UE is estimated. This can comprise estimating the downlink quality for both primary and secondary HS-DSCH serving cells. Also, this estimation can comprises estimating available HS-DSCH SINR.

This estimation is explained in more detail above.

In a select mode step, the mode is selected. The mode is selected for the UE based on the estimated downlink quality, the mode being either a switching mode, an aggregation mode or a default mode. In one embodiment, the multi cell switching mode is a dual cell switching mode and the multi cell aggregation mode is a dual cell aggregation mode. The selection of mode in the RBS is explained in more detail above.

In a configure selected mode step 40, the selected mode for the UE is configured. Again, the details of this is presented above.

The method may be repeated at arbitrary frequency, even at speeds to allow mode selection in every TTI.

FIG. 6B is a flow chart illustrating a method performed in the RBS according to other embodiments. The steps of FIG. 6B having the same reference numerals as those of FIG. 6A are equivalent and will not be described again.

In an obtain configuration data step 42, configuration data is obtained from a controlling node (e.g. RNC) in terms of modes that can be used.

In an optional receive recommendation step 43, the RBS receives a recommendation from the LIE. This recommendation contains the mode which the UE recommends to use.

The select mode step 39 takes into consideration the configuration data, and/or UE recommendation when either or both of these parameters are made available.

Figure 7:
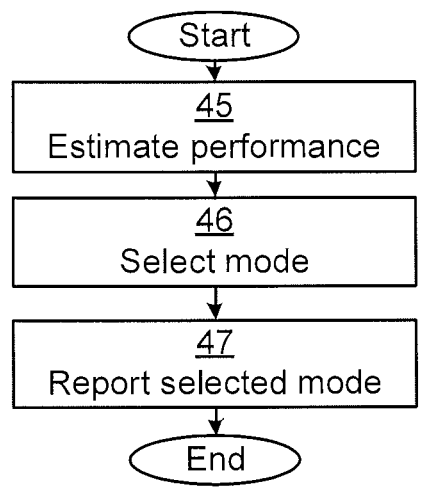
FIG. 7 is a flow chart illustrating a method performed in the UE of FIGS. 1, 2 and 4, according to one embodiment.

FIG. 7 is a flow chart illustrating a method performed in the UE of FIGS. 1, 2 and 4, according to one embodiment.

In an estimate performance step 45, performance is estimated for a single cell mode, multi cell switching mode and multi cell aggregation mode, as is described in more detail above. The estimated performance can comprise one or more of bitrate, throughput and signal quality.

In a select mode step 46, a mode is selected, being one of the default mode, multi cell switching mode and multi cell aggregation mode which has the highest estimated performance.

In a report selected mode step 47, the selected mode is reported as a recommendation to the network, i.e. to the serving RBS and/or RNC.

The method may be repeated at arbitrary frequency, even at speeds to allow mode selection in every TTI.

Figure 8:
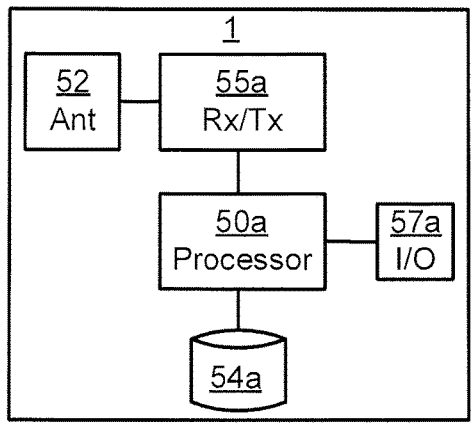
FIG. 8 is a schematic diagram showing some components of the RBS of FIGS. 1, 2 and 4.

FIG. 8 is a schematic diagram showing some components of the RBS 1 of FIGS. 1, 2 and 4. A processor 50a is provided using any combination of one or more of a suitable central processing unit (CPU), multiprocessor, microcontroller, digital signal processor (DSP), application specific integrated circuit etc., capable of executing software instructions stored in a computer program product 54a, e.g. in the form of a memory. The processor 50a can be configured to execute the method described with reference to FIGS. 6A-B above.

The computer program product 54a can be a memory or any combination of read and write memory (RAM) and read only memory (ROM). The memory also comprises persistent storage, which, for example, can be any single one or combination of magnetic memory, optical memory, solid state memory or even remotely mounted memory.

The RBS 1 further comprises an I/O interface 57a for communicating with the core network and optionally with other RBSs.

The RBS 1 also comprises one or more transceivers 55a, comprising analogue and digital components, and a suitable number of antennas 52 for radio communication with UEs within one or more radio cells. The processor 50a controls the general operation of the RBS, e.g. by sending control signals to the transceiver 55a and receiving reports from the transceiver 55a of its operation. In one embodiment, the I/O interface 57a is directly connected to the transceiver 55a, whereby data to and from the core network is directly routed between the I/O interface 57a and the transceiver 55a.

Other components of the RBS are omitted in order not to obscure the concepts presented herein.

Figure 9:
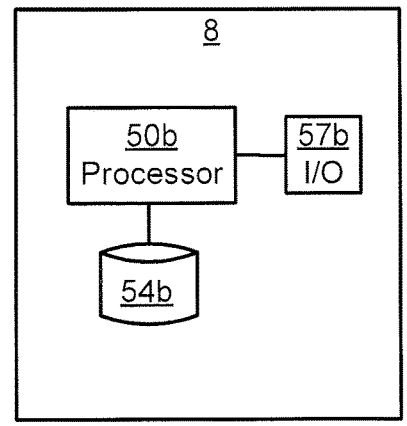
FIG. 9 is a schematic diagram showing some components of the RNC of FIG. 4.

FIG. 9 is a schematic diagram showing some components of the RNC of FIG. 4. A processor 50b is provided using any combination of one or more of a suitable central processing unit (CPU), multiprocessor, microcontroller, digital signal processor (DSP), application specific integrated circuit etc., capable of executing software instructions stored in a computer program product 54b, e.g. in the form of a memory. The processor 50ob can be configured to execute the method described with reference to FIGS. 5A-B above.

The computer program product 54b can be a memory or any combination of read and write memory (RAM) and read only memory (ROM). The memory also comprises persistent storage, which, for example, can be any single one or combination of magnetic memory, optical memory, solid state memory or even remotely mounted memory.

The RNC 8 further comprises an I/O interface 57b for communicating with RBSs and the core network. The I/O interface 57b is configured to relay data to and from the RBSs and core network. The processor 50b controls the general operation of the RNC 8, e.g. by sending control signals to the I/O interface 57b and receiving reports from the I/O interface 57b of its operation.

Other components of the RNC 8 are omitted in order not to obscure the concepts presented herein.

Figure 10:
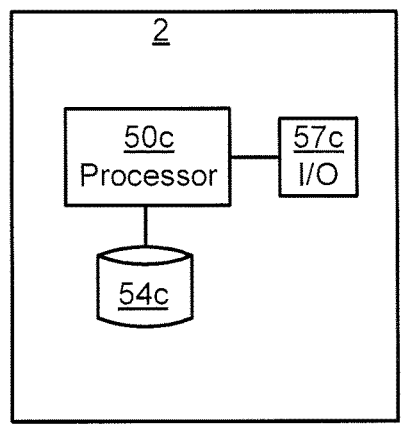
FIG. 10 is a schematic diagram showing some components of the UE of FIGS. 1, 2 and 4.

FIG. 10 is a schematic diagram showing some components of the UE of FIGS. 1, 2 and 4. A processor 50c is provided using any combination of one or more of a suitable central processing unit (CPU), multiprocessor, microcontroller, digital signal processor (DSP), application specific integrated circuit etc., capable of executing software instructions stored in a computer program product 54c, e.g. in the form of a memory. The processor 50c can be configured to execute the method described with reference to FIG. 7 above.

The computer program product 54c can be a memory or any combination of read and write memory (RAM) and read only memory (ROM). The memory also comprises persistent storage, which, for example, can be any single one or combination of magnetic memory, optical memory, solid state memory or even remotely mounted memory.

The UE 2 further comprises an I/O interface 57c for communicating with a user and external components such as the serving RBS. The I/O interface typically comprises a display and some form of user input device, such as a touch sensitive display and/or physical buttons. The processor 50c controls the general operation of the UE 2.

Other components of the UE 2 are omitted in order not to obscure the concepts presented herein.

Figure 11:
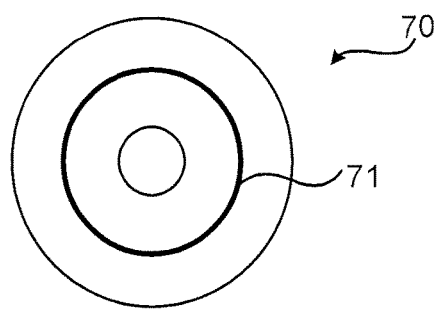
FIG. 11 shows one example of a computer program product comprising computer readable means.

FIG. 11 shows one example of a computer program product 70 comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as any one of the memories 54a-c of the RBS, RNC or LTE, respectively. While the computer program 71 is here schematically shown as a track on the depicted optical disk, the computer program can be stored in any way which is suitable for the computer program product.

The present invention may, of course, be carried out in other ways than those specifically set forth herein without departing from essential characteristics of the invention. The present embodiments are to be considered in all respects as illustrative and not restrictive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of configuring a user equipment (UE) to a downlink mode, the method being executed in a radio network controller (RNC) and comprising:
    obtaining UE capability regarding multi-cell transmission modes;
    obtaining downlink load during a first duration;
    estimating geometry for the UE during a first duration, the geometry comprising a ratio of a power received on a first radio link to the sum of noise and powers received on other radio links;
    based on the UE capability and the estimated geometry and downlink load during the first duration, configuring the UE to one of a multi-cell switching mode, in which a total of only one of multiple cells having better channel conditions, relative to the others of the multiple cells, transmits data to the UE during a predetermined duration, and a multi-cell aggregation mode, in which each of multiple cells transmits different data to the UE during a predetermined duration;
    obtaining downlink load during a second duration;
    estimating geometry for the UE during a second duration; and
    based on the UE capability and the estimated geometry and downlink load during the second duration, configuring the UE to the other of the multi-cell switching mode and multi-cell aggregation mode.

2. The method of claim 1 wherein estimating geometry comprises using Common Pilot Indicator Channel Chip Energy/Noise (CPICH Ec/No) or Received Signal Code Power (RSCP).

3. The method of claim 1 wherein the step of configuring the UE to a mode comprises configuring the UE to the multi-cell switching mode when the geometry is high and configuring the UE to the multi-cell aggregation mode when the geometry is low.

4. The method according claim 1:
    wherein the multi-cell switching mode is a dual cell switching mode;
    wherein the multi-cell aggregation mode is a dual cell aggregation mode.

5. The method of claim 4, further comprising:
    estimating geometry for the UE during a third duration; and
    based on the estimated geometry during the third duration, configuring the UE to a default mode;
    wherein in the default mode, a secondary High-Speed Downlink Shared Channel (HS-DSCH) serving cell is deactivated for the UE.

6. The method of claim 1 wherein the step of estimating a geometry comprises estimating the geometry according to the formula:

$$HsGeometry = (maximumDlTxPower - nonHsPower) / CpichPower * CpichEc/No;$$

where HsGeometry is the geometry, CpichPower is the Common Pilot Indicator Channel (CPICH) power, CpichEc/No is the reported CPICH Energy/Noise by the UE, maximumDlTxPower is the maximum downlink transmit power, and nonHsPower is the non-High Speed power reported by a Node B.

7. The method of claim 1:
wherein the estimating a geometry comprises estimating a downlink geometry for a primary and a secondary High-Speed Downlink Shared Channel (HS-DSCH) serving cells;
wherein the configuring the UE to a mode based on the geometry comprises evaluating a function depending on the downlink geometry for the primary and secondary HS-DSCH serving cells, such that when the result of the evaluating is higher than a first predefined threshold, the UE is configured to the multi-cell switching mode, otherwise the UE is configured to the multi-cell aggregation mode.

8. The method of claim 1:
further comprising receiving radio base station (RBS) capability in terms of supported modes;
wherein the configuring the UE to a mode comprises configuring the UE to a mode based on the received RBS capability.

9. The method of claim 8 wherein the capabilities in terms of supported modes are frequency band dependent.

10. The method of claim 1:
further comprising receiving, from the UE, a recommendation of a mode;
wherein the configuring the UE to a mode comprises configuring the UE to a mode based on the recommendation of a mode.

11. A method of configuring a user equipment (UE) to a downlink mode, the method being executed in a radio base station (RBS) and comprising:
obtaining UE capability regarding multi-cell transmission modes;
obtaining downlink load during a first duration;
estimating downlink quality for the UE during a first duration;
based on the UE capability and the estimated downlink quality and downlink load during the first duration, configuring the UE to one of a multi-cell switching mode, in which a total of only one of multiple cells having better channel conditions, relative to the others of the multiple cells, transmits data to the UE during a predetermined duration, and a multi-cell aggregation mode, in which each of multiple cells transmits different data to the UE during a predetermined duration;
obtaining downlink load during a second duration;
estimating downlink quality for the UE during a second duration; and
based on the UE capability and the estimated downlink quality and downlink load during the second duration, configuring the UE to the other of the multi-cell switching mode and multi-cell aggregation mode.

12. The method of claim 11 wherein the estimating downlink quality comprises estimating the downlink quality for both primary and secondary High-Speed Downlink Shared Channel (HS-DSCH) serving cells.

13. The method of claim 11 wherein the step of estimating the downlink quality comprises estimating available High-Speed Downlink Shared Channel Signal to Interference and Noise Ratio (HS-DSCH SINR).

14. The method of claim 13 wherein the available HS-DSCH SINR is estimated according to the formula:

$$availSfdcHsSINR = SFHs * CINRCPICH * (maximumDlTxPower - nonHsPower)/CpichPower$$

where availSfdcHsSINR is the available HS-DSCH SINR for the UE in a cell, CINRCPICH is the Common Pilot Indicator Channel Carrier to Interference and Noise Ratio estimated from reported Channel Quality Indicator (CQI), SFHs is a spreading factor of High Speed Physical Downlink Shared Channel (HS-PDSCH), maximumDlTxPower is the maximum downlink transmit power, and nonHsPower is the non-High Speed power reported by a Node B.

15. The method of claim 11:
wherein the multi-cell switching mode is a dual cell switching mode;
wherein the multi-cell aggregation mode is a dual cell aggregation mode.

16. The method of claim 15, further comprising:
estimating downlink quality for the UE during a third duration; and
based on the estimated downlink quality during the third duration, configuring the UE to a default mode;
wherein in the default mode, a secondary High-Speed Downlink Shared Channel (HS-DSCH) serving cell is deactivated for the UE.

17. The method of claim 11:
further comprising obtaining configuration data from a controlling node in terms of modes that can be used;
wherein the configuring the UE to a mode complies with the configuration data.

18. The method of claim 17 wherein the controlling node is an Radio Network Controller (RNC).

19. The method of claim 11:
further comprising receiving, from the UE, a recommendation of a mode;
wherein the configuring the UE to a mode comprises configuring the UE to a mode based on the recommendation of a mode.

20. A method executed in a user equipment (UE) of suggesting a downlink mode, the method comprising:
obtaining UE capability regarding multi-cell transmission modes;
estimating performance for each of a default mode, a multi-cell switching mode in which a total of only one of multiple cells having better channel conditions, relative to the others of the multiple cells, transmits data to the UE during a predetermined duration, and a multi-cell aggregation mode in which each of multiple cells transmits different data to the UE during a predetermined duration;
wherein in the default mode, a secondary High-Speed Downlink Shared Channel (HS-DSCH) serving cell is deactivated for the UE;
selecting a mode being one of the default mode, the multi-cell switching mode, and the multi-cell aggregation mode which is supported by the UE and has highest estimated performance; and
reporting the selected mode as a recommendation to a network serving the UE.

21. The method of claim 20 wherein the estimated performance comprises at least one of bitrate, throughput, and signal quality.

22. A radio network controller (RNC) operative to configure a user equipment (UE) to a downlink mode, the RNC comprising a processor configured to:
obtaining UE capability regarding multi-cell transmission modes;
obtaining downlink load during a first duration;
estimate geometry for the UE during a first duration, the geometry comprising a ratio of a power received on a first radio link to the sum of noise and powers received on other radio links;
based on the UE capability and the estimated geometry and downlink load during the first duration, configure the UE to one of a multi-cell switching mode, in which a total of only one of multiple cells better channel conditions, relative to the others of the multiple cells, transmits data to the UE during a predetermined duration, and a multi-cell aggregation mode, in which each of multiple cells transmits different data to the UE during a predetermined duration;

obtain downlink load during a second duration;

estimate geometry for the UE during a second duration; and based on the UE capability and the estimated geometry and downlink load during the second duration, configure the UE to the other of the multi-cell switching mode and multi-cell aggregation mode.

23. A radio base station (RBS) operative to configure a user equipment (UE) to a downlink mode, the RBS comprising a processor configured to:

obtaining UE capability regarding multi-cell transmission modes;

obtaining downlink load during a first duration;

estimate downlink quality for the UE during a first duration;

based on the estimated geometry during the first duration, configure the UE to one of a multi-cell switching mode, in which a total of only one of multiple cells better channel conditions, relative to the others of the multiple cells, transmits data to the UE during a predetermined duration, and a multi-cell aggregation mode, in which each of multiple cells transmits different data to the UE during a predetermined duration;

obtain downlink load during a second duration;

estimate downlink quality for the UE during a second duration; and based on the UE capability and the estimated downlink quality and downlink load during the second duration, configure the UE to the other of the multi-cell switching mode and multi-cell aggregation mode.

24. A user equipment (UE) operative to suggest a downlink mode, the UE comprising a processor configured to:

obtain UE capability regarding multi-cell transmission modes;

estimate performance for each of a default mode, a multi-cell switching mode in which a total of only one of multiple cells having better channel conditions, relative to the others of the multiple cells, transmits data to the UE during a predetermined duration, and a multi-cell aggregation mode in which each of multiple cells transmits different data to the UE during a predetermined duration;

wherein in the default mode, a secondary High-Speed Downlink Shared Channel (HS-DSCH) serving cell is deactivated for the UE;

select a mode being one of the default mode, the multi-cell switching mode, the multi-cell aggregation mode which is supported by the UE and has highest estimated performance; and report the selected mode as a recommendation to a network serving the UE.

25. A user equipment (UE) with a downlink mode configured by a radio network controller (RNC), wherein the RNC comprises a processor configured to:

obtain UE capability regarding multi-cell transmission modes;

obtain downlink load during a first duration;

estimate geometry for the UE during a first duration, the geometry comprising a ratio of a power received on a first radio link to the sum of noise and powers received on other radio links;

based on the estimated geometry during the first duration, configuring the UE to one of a multi-cell switching mode, in which a total of only one of multiple cells having better channel conditions, relative to the others of the multiple cells, transmits data to the UE during a predetermined duration, and a multi-cell aggregation mode, in which each of multiple cells transmits different data to the UE during a predetermined duration;

obtain downlink load during a second duration;

estimate geometry for the UE during a second duration; and based on the UE capability and the estimated geometry and downlink load during the second duration, configure UE to the other of the multi-cell switching mode and multi-cell aggregation mode.

* * * * *